United States Patent
Takeda

(10) Patent No.: US 11,476,532 B2
(45) Date of Patent: Oct. 18, 2022

(54) BATTERY MODULE

(71) Applicant: Panasonic Intellectual Property Management Co., Ltd., Osaka (JP)

(72) Inventor: Katsutoshi Takeda, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 31 days.

(21) Appl. No.: 16/975,806

(22) PCT Filed: Feb. 13, 2019

(86) PCT No.: PCT/JP2019/004944
§ 371 (c)(1),
(2) Date: Aug. 26, 2020

(87) PCT Pub. No.: WO2019/167612
PCT Pub. Date: Sep. 6, 2019

(65) Prior Publication Data
US 2020/0411818 A1    Dec. 31, 2020

(30) Foreign Application Priority Data

Feb. 27, 2018  (JP) .............................. JP2018-033487

(51) Int. Cl.
*H01M 10/6555* (2014.01)
*H01M 10/657* (2014.01)
(Continued)

(52) U.S. Cl.
CPC ......... *H01M 50/20* (2021.01); *H01M 10/657* (2015.04); *H01M 10/658* (2015.04);
(Continued)

(58) Field of Classification Search
CPC ........... H01M 10/052; H01M 10/6555; H01M 10/657; H01M 10/658; H01M 50/20; H01M 50/204; Y02E 60/10
See application file for complete search history.

(56) References Cited

U.S. PATENT DOCUMENTS

2011/0159340 A1* 6/2011 Hu ................... H01M 10/6555
                                                        429/120
2013/0130078 A1   5/2013 Schaefer et al.
(Continued)

FOREIGN PATENT DOCUMENTS

JP   2010-97693 A    4/2010
JP   2010-192333 A   9/2010
(Continued)

OTHER PUBLICATIONS

International Search Report dated Apr. 2, 2019, issued in counterpart application No. PCT/JP2019/004944 (2 pages).

*Primary Examiner* — Lingwen R Zeng
(74) *Attorney, Agent, or Firm* — WHDA, LLP

(57) ABSTRACT

A battery module includes a plurality of batteries and at least one spacer disposed between adjacent batteries among the plurality of batteries. The spacer includes at least one reflection layer which reflects at least 60% of an electromagnetic wave having a wavelength of 0.7 to 3 μm. The at least one reflection layer faces to one of the adjacent batteries.

8 Claims, 3 Drawing Sheets

(51) Int. Cl.
*H01M 10/658* (2014.01)
*H01M 50/20* (2021.01)
H01M 10/052 (2010.01)
H01M 50/204 (2021.01)

(52) U.S. Cl.
CPC ...... *H01M 10/6555* (2015.04); *H01M 10/052* (2013.01); *H01M 50/204* (2021.01); *Y02E 60/10* (2013.01)

(56) References Cited

U.S. PATENT DOCUMENTS

2016/0365552 A1\* 12/2016 Kato .................. H01M 50/224
2017/0141723 A1 5/2017 Heishi et al.

FOREIGN PATENT DOCUMENTS

| JP | 2012-124319 A | 6/2012 |
| JP | 2013-511116 A | 3/2013 |
| JP | 2015-211013 A | 11/2015 |
| WO | 2016/013661 A1 | 1/2016 |

\* cited by examiner

BATTERY MODULE

TECHNICAL FIELD

The present disclosure relates to a battery module.

BACKGROUND ART

Heretofore, a battery module has been known in which electrically connected batteries and spacers are alternately disposed in a predetermined direction (for example, see PTL 1). The spacer disclosed in PTL 1 includes a medium which is a cooling medium to absorb heat generated by a single battery adjacent thereto and which is formed of a phase change material capable of changing from a solid phase to a liquid phase by heat absorption. This medium is held by the spacer while being in a solid phase and is also disposed so as to flow out of the spacer when the phase change occurs from a solid to a liquid. PTL 1 has disclosed that when some of the single batteries has thermal anomaly, chain heat generation between adjacent single batteries can be suppressed.

CITATION LIST

Patent Literature

PTL 1: Japanese Published Unexamined Patent Application No. 2010-192333

SUMMARY OF INVENTION

In a battery module including a plurality of batteries, when some of the batteries causes abnormal heat generation, to prevent chain heat generation by suppressing an increase in temperature of the other batteries is an important subject. In recent years, in association with an increase in capacity of batteries and an increase in energy density thereof, a heat generation amount in anomalous occurrence is increased; hence, by related techniques including that disclosed in PTL 1, it is supposed that the chain heat generation of the batteries as described above cannot be sufficiently prevented.

A battery module according to an aspect of the present disclosure comprises a plurality of batteries; and at least one spacer provided between adjacent batteries among the plurality of batteries, and the spacer includes at least one reflection layer which reflects at least 60% of an electromagnetic wave having a wavelength of 0.7 to 3 μm.

According to the above aspect of the present disclosure, even when some of the batteries causes abnormal heat generation, a battery module can be provided which is able to prevent the chain heat generation by suppression of the increase in temperature of the other batteries.

DESCRIPTION OF EMBODIMENT

Figure 1:
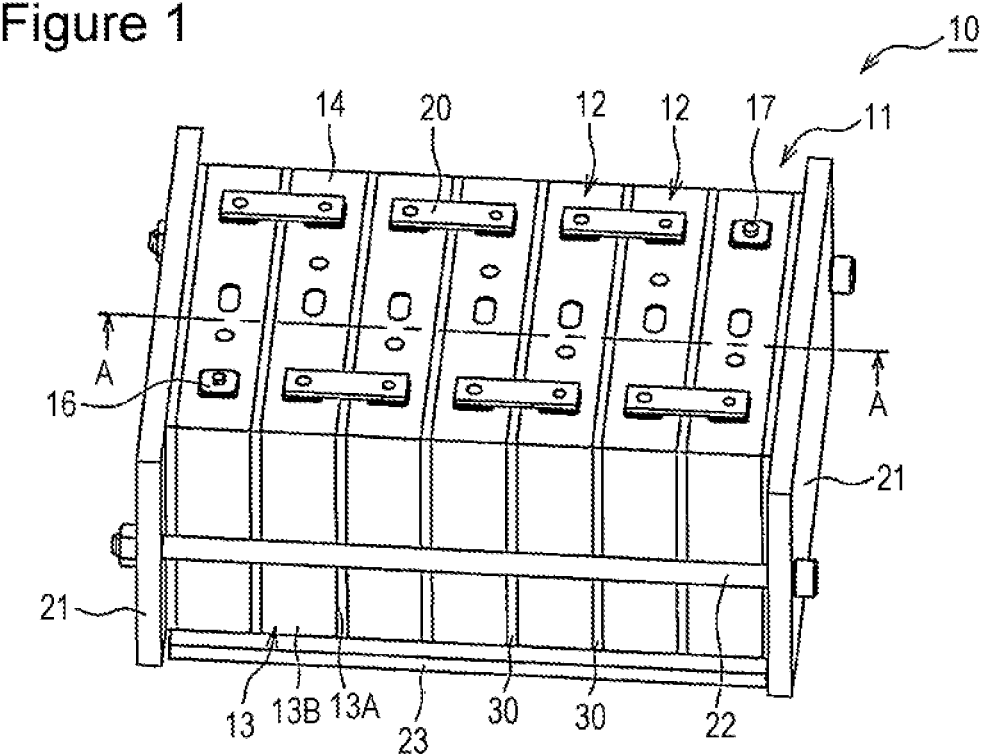
FIG. 1 is a perspective view of a battery module according to one example of an embodiment.

Hereinafter, with reference to the drawings, one example of an embodiment will be described in detail. However, a battery module of the present disclosure is not limited to that of the following embodiment. The drawing to be referred for description of the embodiment is schematically drawn, and for example, dimensional ratios of constituent elements drawn in the drawings are to be understood in consideration of the following description. In addition, in the present specification, the term "approximately" indicates, in the case of "approximately parallel", both a perfect parallel state and a state in which the parallelism is substantially recognized.

Hereinafter, although a plurality of batteries forming a battery laminate is to be described based on assumption that the batteries are electrically connected to each other, the batteries may be not electrically connected to each other, or some batteries thereof may only be electrically connected to each other. That is, the batteries forming one battery laminate each may be configured to be connected to a power source and a load in a chargeable/dischargeable manner, or predetermined blocks of the batteries described above each may be configured to be connected to a power source and a load in a chargeable/dischargeable manner. In addition, as an electrode body forming the battery, although a laminate type electrode body in which positive electrodes and negative electrodes are alternately laminated with separators interposed therebetween will be described by way of example, the electrode body may be a winding type electrode body in which a long positive electrode and a long negative electrode are spirally wound with separators interposed therebetween may also be used.

Figure 2:
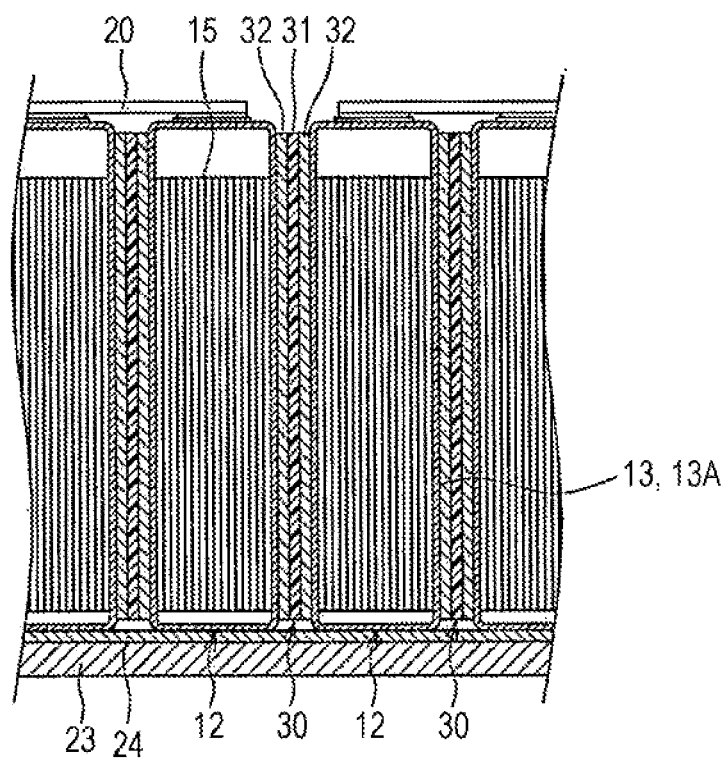
FIG. 2 is a view partially showing a cross-section taken along a line A-A in FIG. 1.

FIG. 1 is a perspective view of a battery module 10 which is one example of the embodiment. FIG. 2 is a view partially showing a cross-section taken along a line A-A in FIG. 1.

As shown in FIGS. 1 and 2, the battery module 10 comprises a plurality of batteries 12 and spacers 30 disposed between adjacent batteries 12 among the plurality of batteries 12. Although being described later in detail, the spacer 30 includes at least one reflection layer which reflects at least 60% of an electromagnetic wave having a wavelength of 0.7 to 3 μm. In the battery module 10, the batteries 12 and the spacers 30 are alternately disposed in a predetermined direction to form a battery laminate 11. In addition, the battery module according to the present disclosure may also be formed of two batteries and one spacer disposed therebetween.

The battery module 10 also comprises a pair of end plates 21 which press the battery laminate 11 from the two sides in the predetermined direction in which the batteries 12 and the spacers 30 are aligned. In this embodiment, the batteries 12 and the spacers 30, which form the battery laminate 11, are aligned in a horizontal direction. Hereinafter, for the convenience of illustration, the predetermined direction in which the batteries 12 and the spacers 30 are aligned is called "a first direction or a thickness direction", a direction orthogonal to the first direction of the horizontal direction is called "a second direction or a lateral direction", and a direction orthogonal to the first and the second directions is called "a vertical direction".

The battery module 10 is an assembled battery formed by electrically connecting the batteries 12 and is also called a battery pack. In this embodiment, all the batteries 12 forming the battery laminate 11 are electrically connected to each other. As an example of the battery 12, a nonaqueous electrolyte secondary battery, such as a lithium ion battery, may be mentioned. In the example shown in FIG. 1, although the battery laminate 11 is formed of seven square batteries 12, the shape, the number, and the like of the batteries 12 are not particularly limited.

The battery module 10 also comprises bind bars 22 coupled to the end plates 21 so that a predetermined clamping pressure is applied to the battery laminate 11 by the pair of end plates 21. The end plates 21 each have a plate shape slightly longer than the battery 12 in the second direction (lateral direction) and hold the battery laminate 11 from the two sides in the first direction. The bind bars 22 are, for example, bar-shaped members provided along the first direction and are provided at the two sides of the battery laminate 11 in the second direction.

In this embodiment, the two bind bars 22 are provided for the pair of end plates 21. That is, the two end plates 21 are coupled to each other with the two bind bars 22. In particular, end portions of the bind bars 22 are fitted to one end plate 21, and the other end portions of the bind bars 22 are fitted to the other end plate 21, so that the predetermined clamping pressure is applied to the battery laminate 11 by the end plates 21. When a fastening force of the bind bars 22 to be applied to the end plates 21 is adjusted, the clamping pressure described above can be changed.

The batteries 12 forming the battery laminate 11 each include a battery case formed of an exterior package can 13 and a sealing plate 14 which seals an opening portion of the exterior package can 13. In the battery laminate 11, the batteries 12 and the spacers 30 are alternately disposed so that the sealing plates 14 of the batteries 12 face the same direction and so that the heights of the sealing plates 14 are the same. In the exterior package can 13, an electrode body 15 and an electrolyte liquid each of which is a power generation element are received. In addition, on the surface of the exterior package can 13, an insulating sheet may be provided, or between the exterior package can 13 and the electrode body 15, an insulating sheet may be provided.

A volume energy density of the battery 12 is, for example, 500 Wh/L or more. In the battery 12 having a high energy density, such as a volume energy density of 500 Wh/L or more, although the heat generation amount in anomalous occurrence is increased, according to the battery module 10 including the spacers 30, even in the case in which the batteries 12 each having a large heat generation amount are used, the chain heat generation can be highly suppressed.

The battery case shown in FIG. 1 by way of example is a metal-made square case formed of a bottom-closed cylindrical exterior package can 13 and a sealing plate 14 having an approximately rectangular shape long in the lateral direction when viewed in plan. The exterior package can 13 has two side walls 13A disposed to face each other, two side walls 13B disposed to face each other, and a bottom surface portion having an approximately rectangular shape long in the lateral direction when viewed from a bottom surface. The four side wall portions are formed approximately orthogonal, for example, to the bottom surface portion. An upper surface portion of the battery case is formed of the sealing plate 14. The side wall 13A is larger than the side wall 13B and has an approximately rectangular shape longer in the lateral direction than in the vertical direction, and the side wall 13B has an approximately rectangular shape longer in the vertical direction than in the thickness direction.

The battery 12 includes a positive electrode terminal 16 and a negative electrode terminal 17. For example, the positive electrode terminal 16 is provided at one end side of the sealing plate 14 in the lateral direction, and the negative electrode terminal 17 is provided at the other end side of the sealing plate 14 in the lateral direction. The battery laminate 11 includes a plurality of bus bars 20 which connect the electrode terminals of adjacent batteries 12 to each other. In this embodiment, the batteries 12 are disposed so that the positions of the positive electrode terminal 16 and the negative electrode terminal 17 of one battery 12 are opposite to those of another battery adjacent thereto, and the batteries 12 adjacent to each other are connected in series by the bus bars 20. That is, the bus bar 20 connects the positive electrode terminal 16 of one of adjacent batteries 12 to the negative electrode terminal 17 of the other one of the adjacent batteries 12.

The electrode body 15 is a laminate type electrode body in which positive electrodes and negative electrodes are alternately laminated with at least one separator interposed therebetween in the first direction. The electrode body 15 may use a plurality of separators or a fan-folded type separator. The laminate structure of the electrode body 15 is maintained, for example, since the batteries 12 are pressed from the two sides in the thickness direction. In this embodiment, the positive electrodes and the negative electrodes are disposed approximately parallel to the side walls 13A of the exterior package can 13, and the side walls 13A are disposed approximately parallel to the end plates 21. Hence, the clamping pressure to be applied to the battery laminate 11 by the pair of end plates 21, that is, a binding force of the battery 12, is applied to the side walls 13A.

The battery module 10 may also comprise a cooling plate 23 to cool the batteries 12. The cooling plate 23 has a function to uniformize the temperatures of the batteries 12, and when abnormal heat generation occurs in some battery 12, this battery 12 is cooled so as to suppress the chain heat generation. A cooling method of the cooling plate 23 may be either a water cooling method in which cooling water is circulated in the plate or an electronic cooling method. The cooling plate 23 is disposed at a bottom portion of the battery module 10 so as to be in contact with the bottom surface portions of the batteries 12. Between the battery laminate 11 and the cooling plate 23, a sheet-shaped buffer material 24 having a high thermal conductivity may be provided, and the battery laminate 11 is disposed on the cooling plate 23 with the buffer material 24 interposed therebetween.

Hereinafter, the spacer 30 will be described in detail.

As shown in FIGS. 1 and 2 by way of example, the spacer 30 is provided between adjacent two batteries 12 and is in contact with the side walls 13A of the adjacent batteries 12. In the example shown in FIG. 1, the spacers 30 are also each disposed between the end plate 21 and the battery 12 adjacent thereto. The battery laminate 11 has eight spacers 30, the number of which is larger than the number of the batteries 12 by one. The clamping pressure by the end plates 21 is, for example, transmitted to the side walls 13A of the batteries 12 through the spacers 30 and is applied to the electrode bodies 15 through the side walls 13A.

When the abnormal heat generation occurs in some battery 12, the spacer 30 has a function to suppress an increase in temperature of another normal battery 12, in particular, a battery 12 (hereinafter, referred to as "adjacent battery" in some cases) disposed adjacent to the battery 12 (hereinafter, referred to as "trigger battery" in some cases) in which the abnormal heat generation occurs. For example, the spacer 30 suppresses the temperature of the adjacent battery to less than a self-heat generation start temperature. In addition, the spacer 30 forms a predetermined gap between adjacent batteries 12 and maintains a predetermined distance between the terminals of the adjacent batteries 12. The spacer 30 may follow the change in volume of the battery 12 in association with charge/discharge thereof so as to absorb this change in volume.

As shown in FIG. 2 by way of example, the spacer 30 includes a sheet-shaped or a plate-shaped heat insulating material 31 functioning as a heat insulating layer having a thermal resistance of 3 K/W or more and reflection layers 32 provided on two surfaces of the heat insulating material 31. In general, although the plate shape indicates a thicker shape than the sheet shape, the two types of shapes are not required to be clearly discriminated from each other. The size of a contact surface of the spacer 30 in contact with the battery 12 (side wall 13A of the exterior package can 13) is preferably equivalent to or smaller than the area of the side wall 13A. In this embodiment, the contact surface of the spacer 30 has approximately the same area as the area of the side wall 13A and is formed larger than the area of each of the positive electrode and the negative electrode. The spacer 30 is disposed in such a way that the periphery of the contact surface thereof approximately coincides with the periphery of the side wall 13A so as not to protrude outside between adjacent two batteries.

The heat insulating material 31 is formed of a material having a low coefficient of thermal conductivity. A constituent material of the heat insulating material 31 preferably has a coefficient of thermal conductivity of 0.05 W/m·K or less. In addition, the heat insulating material 31 may be formed of an elastic deformable material having a low elastic modulus. The heat insulating material 31 is formed, for example, of a resin sheet, an inorganic material sheet, or a fiber sheet having a coefficient of thermal conductivity of 0.05 W/m·K or less. Although not particularly limited as long as a thermal resistance of 3 K/W or more is realized, the thickness of the heat insulating material 31 is preferably 0.1 to 3 mm. The thermal resistance of the heat insulating material 31 can be calculated by the following equation.

$$R = 1/\lambda \times d/S \quad \text{Equation:}$$

R: thermal resistance (K/W)
$\lambda$: coefficient of thermal conductivity of heat insulating material (W/(m·K))
d: thickness of heat insulating material (m)
S: area of heat insulating material (m$^2$)

The coefficient of thermal conductivity can be measured by a thermal conductivity measurement device using a steady state method (guarded hot plate method or heat flow meter method) or an unsteady state method (laser flash method or hot wire method).

As a particular example of the heat insulating material 31, for example, there may be mentioned a glass wool heat insulating sheet or a heat insulating sheet, such as NASBIS (registered trademark), in which fibers are impregnated with a silica aerogel. In addition, the heat insulating material 31 (heat insulating sheet) may be a rubber-made sheet of a silicone rubber, a fluorine rubber, an ethylene-propylene rubber, or the like: or a foamed sheet of a polyurethane, a polyolefin, a polystyrene, a polyimide, a phenol resin, a silicone resin, or the like. The heat insulating material 31 may be formed by laminating a plurality of heat insulating sheets and may have the structure in which for example, NASBIS and a silicone rubber are laminated to each other.

The reflection layer reflects at least 60% of an electromagnetic wave having a wavelength of 0.7 to 3 µm. Since the reflection layers 32 each reflecting an electromagnetic wave having the wavelength described above are disposed between adjacent batteries 12, radiation heat generated from the trigger battery is blocked, and the increase in temperature of the adjacent battery can be suppressed. Over the entire wavelength range of 0.7 to 3 µm, the reflection layer 32 has a reflectance of at least 60% and preferably has a reflectance of at least 70%. Although not particularly limited as long as at least 60% of an electromagnetic wave in the wavelength range described above can be reflected, the thickness of the reflection layer 32 is preferably 50 to 500 µm. The reflectance of the reflection layer 32 can be measured by a spectral reflectance measurement device.

Although the reflection layer 32 may be provided on one surface of a heat insulating sheet forming the heat insulating material 31, the reflection layers 32 are preferably provided on two surfaces of the heat insulating sheet. Although the reflection layer 32 may be partially provided on the surface of the heat insulating material 31, the reflection layer 32 is preferably provided approximately over the entire region of the surface of the heat insulating material 31. In addition, the reflection layer 32 is preferably formed to have an area larger than that of each of the positive electrode and the negative electrode so as to be overlapped with the entire positive electrode and the entire negative electrodes in the thickness direction of the battery module 10.

The reflection layer 32 is formed, for example, of a metal, an inorganic material, or a resin each of which can reflect at least 60% of an electromagnetic wave having a wavelength of 0.7 to 3 µm. The reflection layer 32 may be provided by adhesion of a sheet-shaped or a plate-shaped reflective material to the surface of the heat insulating material 31 or may be formed thereon by deposition, sputtering, or the like. In addition, a coating film containing a material which reflects at least 60% of an electromagnetic wave having a wavelength of 0.7 to 3 µm may be formed on the surface of the heat insulating material 31 as the reflection layer 32. In consideration of the reflectance of an electromagnetic wave in the above wavelength range, a heat resistance property, a film forming property, and the like, the reflection layer 32 is preferably a metal layer. As a preferable metal for the reflection layer 32, for example, there may be mentioned stainless steel, nickel, rhodium, silver, copper, or gold. The reflection layer 32 may be formed by laminating a plurality of materials or may have the structure in which, for example, metal layers are laminated to each other.

As described above, the spacer 30 has a layer structure, that is, the reflection layer 32/the heat insulating material 31/the reflection layer 32, in which the heat insulating material 31 is sandwiched between the two reflection layers 32. In the example shown in FIG. 2, the reflection layer 32 is in contact with the side wall 13A of the battery 12. Between adjacent two batteries 12, since the reflection layers 32 each reflecting at least 60% of an electromagnetic wave having a wavelength of 0.7 to 3 µm and the heat insulating material 31 having a thermal resistance of 3 K/W or more are disposed, the radiation heat generated from the trigger battery is blocked, and the increase in temperature of the adjacent battery can be suppressed. In addition, the chain heat generation of the batteries 12 can also be prevented.

Figure 3:
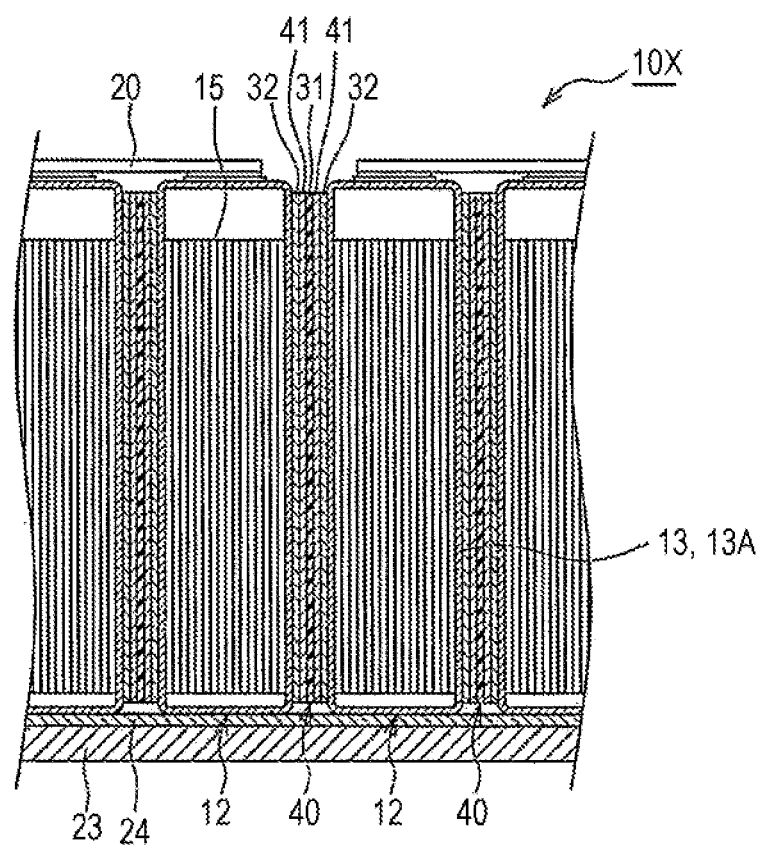
FIG. 3 is a cross-sectional view of a battery module according to another example of the embodiment.

FIG. 3 is a view showing a battery module 10X including spacers 40 which is another example of this embodiment. Although being similar to the spacer 30 in terms of including the heat insulating material 31 and the reflection layers 32, the spacer 40 shown in FIG. 3 by way of example is different from the spacer 30 in terms of including heat absorption layers 41 each having a heat absorption amount of 300 kJ/kg or more. The heat absorption layer 41 has a function to suppress the increase in temperature of the adjacent battery by absorbing the heat of the trigger battery. In consideration of the self-heat generation start temperature, the heat absorption amount of the heat absorption layer 41 is preferably 1,000 kJ/kg or more and more preferably 1,500 kJ/kg or more. The heat absorption amount of the heat absorption layer 41 can be measured by a thermal gravity/differential scanning calorie simultaneous measurement device.

Although the heat absorption layer 41 may be provided on one surface of a heat insulating sheet forming the heat insulating material 31, the heat absorption layers 41 are preferably provided on two surfaces of the heat insulating sheet. The spacer 40 has a layer structure, that is, the reflection layer 32/the heat absorption layer 41/the heat insulating material 31/the heat absorption layer 41/the reflection layer 32, in which the heat absorption layer 41 is provided between the heat insulating material 31 and the reflection layer 32. In addition, the spacer may also have a layer structure, that is, the heat absorption layer 41/the reflection layer 32/the heat insulating material 31/the heat absorption layer 41/the reflection layer 32, in which the reflection layer 32 is provided between the heat insulating material 31 and the heat absorption layer 41.

The heat absorption layer 41 is a layer containing a hydrate, such as $MgSO_4 \cdot 7H_2O$, $La_2(SO_4)_3 \cdot XH_2O$, or $Al_2(SO_4)_3 \cdot 16H_2O$, and absorbs heat of the trigger battery using a dehydration reaction in which absorbed water is removed from the hydrate. In addition, the heat absorption layer 41 may be a layer containing erythritol or the like. In this case, by the use of the latent heat of erythritol generated during the phase transition from a solid to a liquid, the heat of the trigger battery is absorbed. In consideration of the self-heat generation start temperature, a reaction temperature of a heat absorption material contained in the heat absorption layer 41 is preferably 150° C. to 200° C. The heat absorption layer 41 is formed, for example, of a heat absorption material and a binding material (resin binder) which forms a layer by binding particles of the heat absorption material together.

Figure 4:
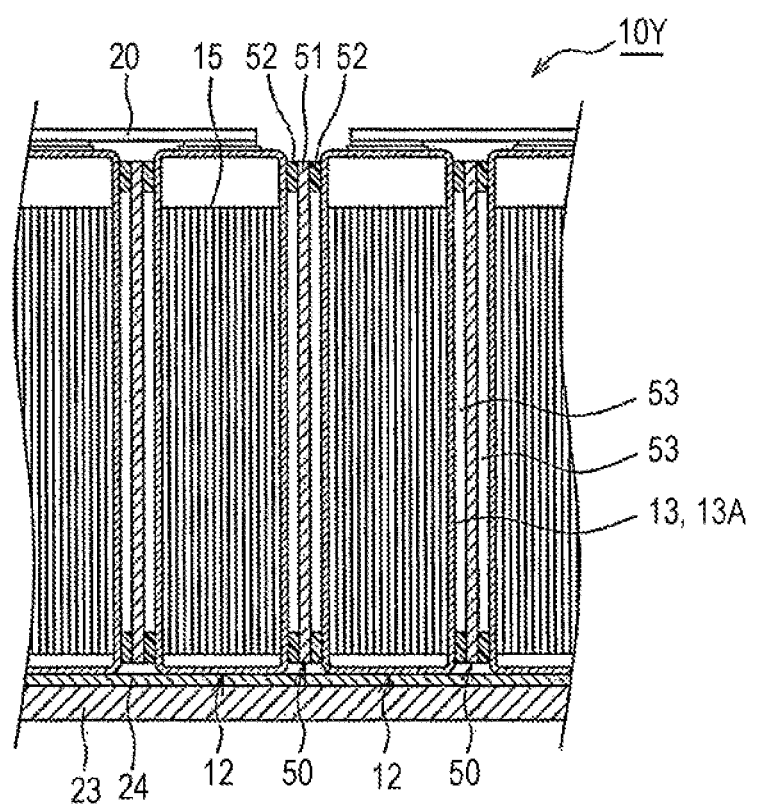
FIG. 4 is a cross-sectional view of a battery module according to another example of the embodiment.

FIG. 4 is a view showing a battery module 10Y including spacers 50 which is another example of the embodiment. The spacer 50 shown in FIG. 4 by way of example includes a sheet-shaped or a plate-shaped reflective material 51 functioning as a reflection layer. As is the reflection layer 32, the reflective material 51 is preferably formed to have an area larger than that of each of the positive electrode and the negative electrode so as to be overlapped with the entire positive electrode and the entire negative electrode in the thickness direction of the battery module 10Y. The reflective material 51 is formed from a material similar to that of the reflection layer 32. Although not particularly limited as long as at least 60% of an electromagnetic wave in the above wavelength range can be reflected, the thickness of the reflective material 51 is preferably 0.1 to 1 mm.

The spacer 50 includes heat insulating materials 52 provided on two surfaces of the reflective material 51. The heat insulating material 52 is formed, for example, from a material similar to that of the heat insulating material 31 and has a thickness of approximately 0.1 to 3 mm. The heat insulating material 52 preferably has a thermal resistance of 3 K/W or more. The heat insulating material 52 may be provided either on parts of the surface of the reflective material 51 or approximately over the entire surface of the reflective material 51. In the example shown in FIG. 4, of the surface of the reflective material 51, the heat insulating material 52 is only provided at an upper end portion and a lower end portion. The heat insulating material 52 may be adhered to or coated on the surface of the reflective material 51.

In the battery module 10Y, an air layer 53 is provided between the reflective material 51 and a battery 12 adjacent thereto. In the example shown in FIG. 4 by way of example, since the heat insulating material 52 is provided on parts of the surface of the reflective material 51, an air layer 53 having a thickness corresponding to that of the heat insulating material 52 is formed. Since the air layer 53 functions as a heat insulating layer, the heat of the trigger battery is blocked, and hence, the increase in temperature of the adjacent battery can be suppressed. In addition, by the use of two reflective materials 51, the air layer 53 may also be formed therebetween. Between adjacent two batteries 12, the air layer 53/the reflective material 51/the air layer 53/the reflective material 51/the air layer 53 may be provided.

According to the battery modules 10, 10X, and 10Y having the structures as described above, when some battery 12 causes abnormal heat generation, the increase in temperature of the other batteries 12 is suppressed, and the chain heat generation can be prevented. In order to confirm the effects described above, a peg having a diameter of 3 mm was stabbed in one battery (rated capacity: 50 Ah, volume energy density: 500 Wh/L) to cause forced short circuit (to form a trigger battery), and the change in temperature of an adjacent battery was measured. As a comparative example, a battery module in which without using reflection layers, a spacer was formed only from a heat insulating material was used, and the degree of suppression of the increase in temperature of the adjacent battery was confirmed. The results are shown below.

EXAMPLE 1

A spacer was used in which reflection layers (reflectance of an electromagnetic wave having a wavelength of 2 µm: 70%) each formed from stainless steel (SUS) having a thickness of 0.1 mm were provided on two surfaces of the heat insulating material used in the comparative example. As a result, the increase in temperature of the adjacent battery was suppressed by approximately 15° C. as compared to that of the comparative example.

EXAMPLE 2

A spacer was used in which reflection layers each formed from SUS having a thickness of 0.1 mm and reflection layers (reflectance of an electromagnetic wave having a wavelength of 0.7 µm: 98.5%) each formed of silver (Ag) having a thickness of 0.1 mm were provided on two surfaces of the heat insulating material used in the comparative example. The spacer had a layer structure of Ag/SUS/heat insulating material/SUS/Ag. As a result, the increase in temperature of the adjacent battery was suppressed by approximately 20° C. as compared to that of the comparative example.

In addition, in the above embodiment, as the battery forming the battery module, although the battery 12 which is a square battery is used by way of example, the battery may be a cylindrical battery including a metal-made cylindrical battery case, a laminate battery including a battery case formed of a laminate sheet in which at least one metal layer and at least one resin layer are laminated to each other, or the like. The battery module including cylindrical batteries may include battery holders to receive the respective batteries. In this case, on a wall surface of the battery holder provided between adjacent cylindrical batteries, the reflection layer described above may also be provided. In addition, on a wall surface of the battery holder facing the side surface of the cylindrical battery, at least one of the above heat insulating layer and the above heat absorption layer may also be provided besides the reflection layer. Alternately, the battery holder may also function as the heat insulating layer.

REFERENCE SIGNS LIST 10 battery module
11 battery laminate
12 battery
13 exterior package can
13A, 13B side wall
14 sealing plate
15 electrode body
16 positive electrode terminal
17 negative electrode terminal
20 bus bar
21 end plate
22 bind bar
23 cooling plate
24 buffer material
30, 40, 50 spacer
31, 52 heat insulating material
32 reflection layer
41 heat absorption layer
51 reflective material
53 air layer

The invention claimed is:

1. A battery module comprising:
a plurality of batteries stacking in a stacking direction; and
at least one spacer disposed between adjacent batteries among the plurality of batteries,
wherein the spacer includes at least one reflection layer which reflects at least 60% of an electromagnetic wave having a wavelength of 0.7 to 3 μm,
wherein the at least one reflection layer includes at least one of steel, nickel, rhodium, silver, copper, and gold,
wherein a thickness of the at least one reflection layer is from 50 μm to 500 μm,
wherein the spacer includes two heat insulating materials, and
wherein the at least one reflection layer is disposed between the two heat insulating materials in the stacking direction.

2. The battery module according to claim 1,
wherein the spacer further includes a heat insulating layer having a thermal resistance of 3 K/W or more.

3. The battery module according to claim 2,
wherein the spacer includes a sheet-shaped or a plate-shaped heat insulating material which functions as the heat insulating layer, and
the reflection layers are provided on two surfaces of the heat insulating material.

4. The battery module according to claim 1,
wherein the spacer further includes a heat absorption layer having a heat absorption amount of 300 kJ/kg or more,
wherein the heat absorption layer includes a hydrate.

5. The battery module according to claim 1,
further comprising at least one air layer between the at least one reflection layer and the plurality of batteries.

6. The battery module according to claim 1,
wherein the reflection layer is formed from a metal.

7. The battery module according to claim 1,
wherein the batteries each have an energy density of 500 Wh/L, or more.

8. The battery module according to claim 1,
wherein the at least one reflection layer includes an exposed portion which does not overlap the two heat insulating materials in the stacking direction.

* * * * *